United States Patent [19]

Smith

[11] Patent Number: 5,850,971
[45] Date of Patent: Dec. 22, 1998

[54] ADJUSTABLE CHOPPER DIVERTER FOR A SPRAY GUN

[76] Inventor: Gary L. Smith, 1760 Monrovia Ave., Unit C-1, Costa Mesa, Calif. 92627

[21] Appl. No.: 828,315

[22] Filed: Mar. 28, 1997

[51] Int. Cl.⁶ .................................................. F23D 11/16
[52] U.S. Cl. ........................ 239/420; 239/433; 239/503; 239/517
[58] Field of Search .................. 239/1, 11, 398, 239/418, 419.3, 420, 433, 499, 502, 503, 505, 507, 509, 511, 513, 517, 522

[56] References Cited

U.S. PATENT DOCUMENTS

| | | | |
|---|---|---|---|
| 3,111,272 | 11/1963 | Underdown et al. .................. | 239/420 |
| 3,801,009 | 4/1974 | Marshall, III ............................ | 239/9 |
| 3,829,016 | 8/1974 | Scharfenberger ...................... | 239/127 |
| 3,905,856 | 9/1975 | Magee et al. .......................... | 156/425 |
| 4,824,017 | 4/1989 | Mansfield .................................. | 239/9 |

FOREIGN PATENT DOCUMENTS 372141  2/1939  Italy ........................................ 239/517

*Primary Examiner*—Andres Kashnikow
*Assistant Examiner*—Lisa Ann Douglas
*Attorney, Agent, or Firm*—James G. O'Neill

[57] ABSTRACT

A flow control device for mounting on a plural component spray gun for controlling the flow of short segments of fiberglass, liquid or powder, into a fan spray pattern of mixed components ejected from a nozzle of the spray gun. An internal passage in the flow control device is provided with a pair of resilient, rectangular plate members movable between open and throttling positions, so as to precisely control the flow of material into the fan spray pattern emitted by the spray gun. The pair of resilient plates are movable by adjusting screws passing through threaded openings formed in opposed side walls of the flow control device.

3 Claims, 1 Drawing Sheet

ADJUSTABLE CHOPPER DIVERTER FOR A SPRAY GUN

BACKGROUND OF THE INVENTION

1. Field of the Invention

This invention relates generally to spray guns and, more particularly, to an adjustable chopper diverter for a spray component system.

2. Description of Related Art

In sophisticated spray component systems, known as plural component systems, two or more components are concurrently sprayed from a spray gun. One of the most useful plural component systems is a fiberglass system. In such a system, a first component, composed of a resin, is sprayed from one nozzle, and a second component, composed of a catalyst, is fed from another nozzle and mixed in a spray directly in front of the spray gun. As soon as the components are mixed, a reaction starts, polymerizing the resin into a solid, coherent mass. However, when the resin is atomized into a spray pattern, misting occurs, resulting in lower fiberglass and resin transfer rates and higher styrene emissions. Spraying of a third component, such as a "chop" into such mixed sprays significantly reduce styrene emissions. Therefore, fiberglass spray guns may be augmented by including a chopper assembly which chops up a fiberglass roving and concurrently sprays short segments of fiberglass into the spray pattern of the mixed resin and catalyst ejected from the resin and catalyst nozzles. This composite, mixed with the short fiberglass strands embedded in the catalyzed resin, is directed to a surface for polymerization on the surface to form the fiberglass article.

Other known equipment mixes components, such as resin and catalyst at a manifold somewhere in or behind the spray gun. Such equipment sprays a high velocity mix of components, combined with blown air, and a chop, liquid or powder is directed into the mix, to create a fiberglass or other materials. In such equipment, as well as the fiberglass spray gun mentioned above, the components can be mixed at the nozzle before it flows out in front of the gun in a fan type pattern. The chopped fiberglass, liquid or powder is then mixed with the fan type pattern in front of the nozzle. However, in known spray guns, the material being injected into the fan spray pattern tends to scatter and miss part of the fan spray pattern, thus causing wastage and not eliminating all emissions. This is somewhat ameliorated by using a chopper diverter or "chute" system to control the flow of such material into the spray fan pattern. But, the known diverters and/or chute systems do not provide sufficient control of the flow of the injected material into fan spray pattern, at all speeds and pressures.

Therefore, there exists the need in the art for an easy to manufacture and use means to control the flow of the chop or other material into the fan spray pattern of mixed components in front of a spray gun.

SUMMARY OF THE INVENTION

Accordingly, it is a general object of the present invention to provide an improved flow control means. It is a particular object of the present invention to provide an improved chopper diverter for a spray gun. It is a still more particular object of the present invention to provide an improved chopper diverter having adjustable control means. It is yet another more particular object of the present invention to provide an improved adjustable chopper diverter means for use with chopped fiberglass, liquids, powders, or the like, to control the spray of such material into a component mixture exiting from a spray gun nozzle.

In accordance with one aspect of the present invention, there is provided a flow control device having a plurality of adjustable control means therein, for mounting to a plural component spray system to control the direction of flow of material exiting from the adjustable control means into a fan spray pattern.

BRIEF DESCRIPTION OF THE DRAWINGS

The objects and features of the present invention, which are believed to be novel, are set forth with particularity in the appended claims. The present invention, both as to organization and manner of operation, together with further objects and advantages, may best be understood by reference to the following description, taken in conjunction with the accompanying drawings, in which:

FIG. 1 is a perspective view of a plural component spray gun, such as a fiberglass system having a chopper system with an improved chopper diverter of the present invention mounted thereon;

FIG. 2 is a side elevational view of a preferred embodiment of the chopper diverter of the present invention; and FIG. 3 is a sectional view of the chopper diverter of FIG. 2, taken along lines 3—3.

DESCRIPTION OF THE PREFERRED EMBODIMENTS

The following description is provided to enable any person skilled in the art to be able to use the invention and sets forth the best modes contemplated by the inventor for carry out his invention. Various modifications, however, will remain readily apparent to those skilled in the art, since the generic principals of the present invention have been defined herein, specifically to provide for a novel and improved flow control means 10.

The flow control means is described in connection with use in a spray gun having a standard chopper system for chopping up and spraying short segments of fiberglass into a fan spray pattern, exiting from a nozzle of a spray gun. It is to be understood, however, that this flow control means could also be used with liquids, powders or other materials that are sprayed into a fan spray pattern in front of a spray gun.

Turning now to FIG. 1, there shown is a spray gun 12 capable of spraying a plural component system, such as a fiberglass component system through a nozzle 14, by means well known by those skilled in the art. The outer boundaries of the fan spray pattern ("fan") 15, such as from a fiberglass component system, is defined by lines 16 on either side thereof. A standard chopper system 18 is mounted to and driven on the spray gun 12, in a manner well known to those skilled in the art. This chopper system 18 includes the adjustable flow control means 10, such as a chopper diverter of the present invention mounted thereon. The flow control means 10 is held in place by a plurality of holding means 20, such as bolts or screws. The chopper diverter 10 includes hollow body having a plurality of adjustable plate means 22, 24, secured therein. The plate means 22, 24, may be made from any desired material, such as a metal or plastic, and control the flow of material, such as chopped fibers 26, exiting from the chopper assembly 18, into the fan 15. The plate means 22 and 24 are adjustable to keep the flow of the chopped fibers between the boundary lines 16 of the fan. It, therefore, can be seen that the adjustable plates allow greater control of the flow of the chop into the fan, therefore, avoiding wastage and minimizing harmful emissions.

Figure 1:
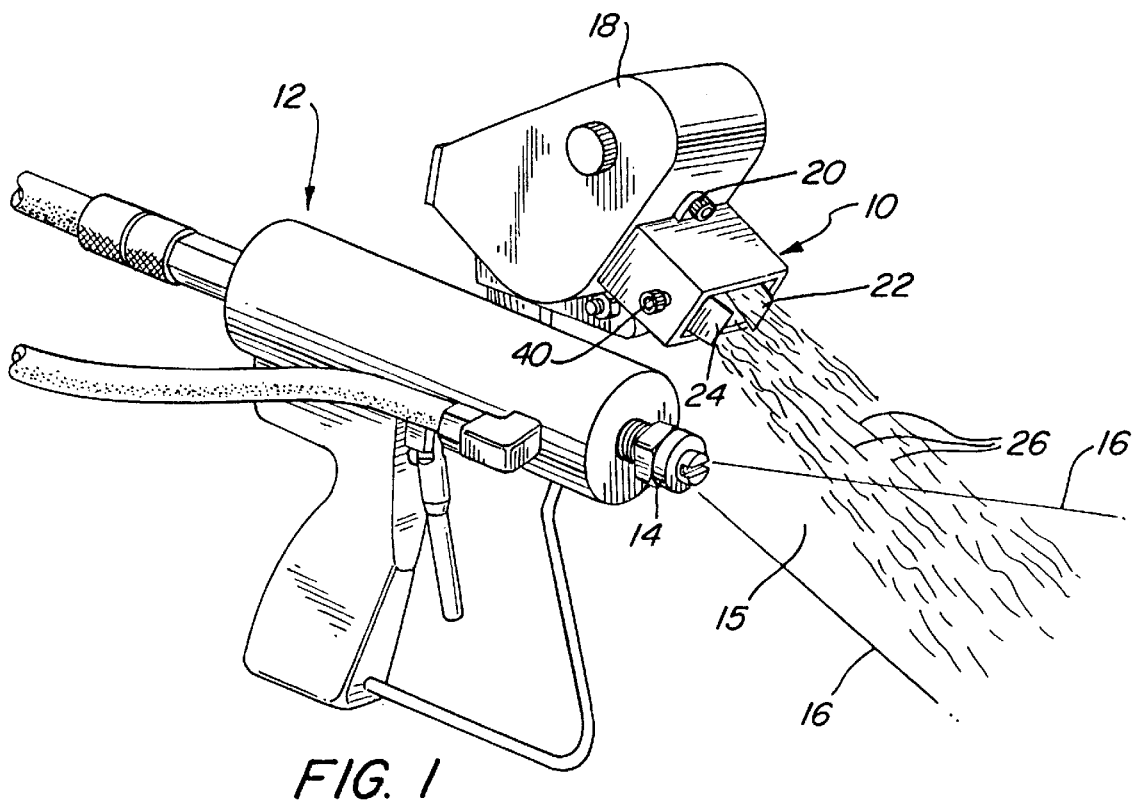
Figure 2:
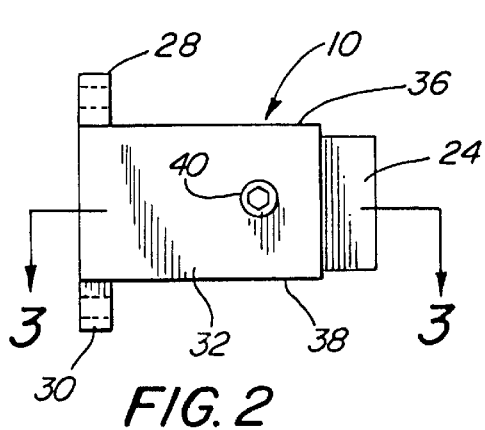
Figure 3:
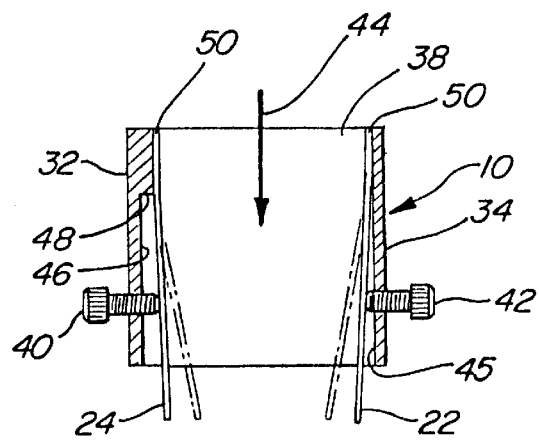

Turning now to FIGS. 2 and 3, there is shown in more detail a preferred embodiment of the chopper diverter 10. The chopper diverter 10 includes a pair of outwardly extending arms or feet 28, 30, having openings formed therethrough, for receipt of the holding means 20, to secure the chopper diverter to the chopper system 18, as is shown in FIG. 1. The body of the chopper diverter 10, may be of any desired shape, but is shown as being a hollow rectangle having a central internal or through passage bounded by two end walls 32, 34, and two side walls 36, 38. Each of the end walls 32, 34, carry adjusting means 40, 42, such as bolts or screws, threadedly received in openings formed through each of the end walls. The inner end of each adjusting means 40, 42, contacts an adjustable plate means 22, 24. Upon actuation of either or both of the adjustable means 40, 42, the adjustable plate means 22, 24, will be moved between the open and closed positions shown in FIG. 3, either substantially parallel to, or against the inner portion of the walls 32, 34, as shown in solid line, or a closed or inner position, as shown in broken line, in FIG. 3. In the closed or inner position shown in broken line, the plates 22, 24 control or throttle material flowing therethrough, in the direction of arrow 42.

Each of the adjustable plates 22, 24, is preferably resilient, with plate 24 shown as being spaced from an inner wall 46, as by means of a spacer or solid portion 48. However, it is to be understood that plate 24 may also be mounted directly against inner wall 46, in the same manner as shown for resilient plate 22.

Except for the resilient adjustable plate means 22, 24, and adjusting means 40, 42, the chopper diverter 10 is of a standard construction known to those skilled in the art. The body of diverter 10 is preferably made from a hardened metal or plastic, with the moveable adjustable plates 22, 24, made from a resilient plastic or a metal, such as spring or stainless steel. The resilient, adjustable plate means 22,24, are secured at one end thereof to the respective inner walls 45 and 46, at or near the top portion thereof at 50, as by welding.

In operation, the adjustable flow control means of the present invention is secured to the chopper assembly 18, as by means of threaded bolts or screws 20 passing through openings in arms 28 and 30. Then, depending on the velocities of the mixed components coming out of the spray gun 12 and the chop 26 into the fan 15, the resilient adjustable plate means 22, 24, will be adjusted inwardly or outwardly, by the adjusting means 40 and 42, to more accurately and positively control the flow of the exiting chop so that it enters between the lines 16 of the fan 15.

It, thus, can be seen that the adjustable flow control means of the present invention provides an improved and easy-to-use system for accurately controlling material being injected into a fan of sprayed material, to improve the operation of a fiberglass or other spray gun, to both save material and lower harmful emissions.

Those skilled in the art will appreciate that various adaptations and modifications of the just-described, preferred embodiments can be configured without departing from the scope and spirit of the invention. Therefore, it is to be understood that, within the scope of the appended claims, the invention may be practiced other than as specifically described herein.

What is claimed is:

1. A chopper diverter for chopped, short segments of fiberglass sprayed into a fan spray pattern emitted by a spray gun, comprising, in combination:

the spray gun having a nozzle which ejects a pair of components which are mixed in a fan spray pattern outside of the nozzle;

a chopper assembly on the spray gun;

the chopper diverter having a rectangular body with a pair of side walls secured to the chopper assembly, adjacent the nozzle, to spray a plurality of chopped, short fiberglass segments into the fan spray patter; the rectangular body being entirely made from a hardened metal;

means for securing the chopper diverter on the chopper assembly;

a pair of adjustable resilient plates held within an interior through passage formed in the chopper diverter for adjusting the flow of chopped, short fiberglass segments through the chopper diverter and into the fan spray pattern of the mixed components and a pair of cooperating adjusting screws passing through openings in wall portions of the chopper diverter.

2. A chopper diverter for chopped, short segments of fiberglass sprayed into a fan spray pattern emitted by a spray gun, comprising, in combination:

the spray gun having a nozzle which ejects a pair of components which are mixed in a fan spray pattern outside of the nozzle;

a chopper assembly on the spray gun;

the chopper diverter having a rectangular body with a pair of end walls and a pair of side walls secured to the chopper assembly, adjacent the nozzle, to spray a plurality of chopped, short fiberglass segments into the fan spray pattern;

means for securing the chopper diverter on the chopper assembly;

a pair of adjustable resilient plates held within an interior through passage formed in the chopper diverter and secured to a portion of the end walls for adjusting the flow of chopped, short fiberglass segments through the chopper diverter and into the fan spray pattern of the mixed components; and a pair of cooperating adjusting screws passing through openings in the pair of side walls of the chopper diverter.

3. The chopper diverter of claim 2 wherein the adjustable, resilient plates are welded to interior portions of the end walls.

* * * * *